(12) United States Patent
Benson et al.

(10) Patent No.: US 12,524,368 B2
(45) Date of Patent: Jan. 13, 2026

(54) RECONFIGURATION OF HUBS TO CONNECT PERIPHERAL DEVICES IN VIDEO CONFERENCING SYSTEMS

(71) Applicant: Hewlett-Packard Development Company, L.P., Spring, TX (US)

(72) Inventors: Roger Dale Benson, Spring, TX (US); Richard ShiJian Lin, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/291,833

(22) PCT Filed: Oct. 13, 2021

(86) PCT No.: PCT/US2021/054852
§ 371 (c)(1),
(2) Date: Jan. 24, 2024

(87) PCT Pub. No.: WO2023/063948
PCT Pub. Date: Apr. 20, 2023

(65) Prior Publication Data
US 2025/0103537 A1    Mar. 27, 2025

(51) Int. Cl.
*G06F 13/42* (2006.01)
(52) U.S. Cl.
CPC .. *G06F 13/4282* (2013.01); *G06F 2213/4002* (2013.01)
(58) Field of Classification Search
CPC .................................................. G06F 21/554
See application file for complete search history.

(56) References Cited

U.S. PATENT DOCUMENTS 6,442,758 B1    8/2002  Jang et al.
7,478,191 B2 *  1/2009  Wurzburg ........... G06F 13/4022
                                                  710/316
(Continued)

FOREIGN PATENT DOCUMENTS

TW    200719318 A    5/2007
TW    201706827 A    2/2017
WO    2014/172678 A1  10/2014

OTHER PUBLICATIONS

Anonymous, "USB Host Switching in Conference Rooms | Acroname", available at <https://acroname.com/blog/usb-host-switching-conference-rooms>, Nov. 19, 2020, 8 pages.

*Primary Examiner* — Henry Tsai
*Assistant Examiner* — Juanito C Borromeo
(74) *Attorney, Agent, or Firm* — Quarles & Brady LLP (57) ABSTRACT

An example apparatus may include a hub and a control unit. The hub may include a first input/output (I/O) connection, a second I/O connection, and a third I/O connection. The first I/O connection may connect to a peripheral device of a video conferencing system, the second I/O connection may connect to a first conferencing application, and the third I/O connection may connect to a second conferencing application via a video conferencing controller connected to the third I/O connection. The control unit may reconfigure the hub to change a connection of the peripheral device from the first conferencing application to the second conferencing application. The control unit may reconfigure the hub based on a location of a computing, wherein the second conferencing application is executed on the computing device.

20 Claims, 4 Drawing Sheets

(56) References Cited

U.S. PATENT DOCUMENTS

| | | |
|---|---|---|
| 2014/0194146 A1* | 7/2014 | Yarvis .................. H04W 4/029 |
| | | 455/456.3 |
| 2016/0170772 A1* | 6/2016 | Krishnamurthy ..... G06F 9/4451 |
| | | 713/100 |
| 2018/0095706 A1 | 4/2018 | Chu et al. |
| 2021/0051036 A1 | 2/2021 | Atkins et al. |
| 2021/0258538 A1 | 8/2021 | Decamp, II et al. |

* cited by examiner

RECONFIGURATION OF HUBS TO CONNECT PERIPHERAL DEVICES IN VIDEO CONFERENCING SYSTEMS

BACKGROUND

Video conferencing systems may be used for video conferences. In some examples, the video conferencing systems may be installed in a dedicated meeting room, and may often include various components such as peripheral devices connected to a host computing device. In some instances, these peripheral devices may be permanently hardwired to the host computing device as well as the infrastructure inside the meeting room.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Generally, a conferencing meeting may be conducted using a conferencing system, which may include a host computing device running a conferencing application. In some examples, conferencing systems may be installed in a meeting room and may be built around the host computing device to include various types of peripheral devices. The conferencing application may control all of the infrastructure of the meeting room including, for example, display devices, webcams, microphones, speakers, and/or the like. However, in cases where guest users may be invited to the meeting room, it may be difficult for the guest users to connect their own computing devices and access the infrastructure of the conferencing system. For instance, when peripheral devices are permanently built into the meeting room, it may be difficult to disconnect the peripheral devices so that the guest computing device may be connected. The difficulty in connecting guest computing devices to existing conferencing systems may cause the guest user to bring their own devices, such as a portable speakerphone, or the like.

Disclosed herein are apparatuses, systems, and methods for allowing guest participants to a conferencing meeting to have access to the infrastructure of a meeting room, for instance, in cases where the guest participants wish to connect their own computing devices, which may be running a different conferencing application, to the conferencing system to gain access to peripheral devices. In some examples, the conferencing system may include control devices, which may be referred to as a video conferencing controller or a center of room control (CoRC), to allow the guest user to interact with the conferencing system. In some examples, the control devices, which may be connected to the host computing device to allow control of the conferencing meeting, may include inputs to allow the guest user to connect their computing device to the conferencing system. By way of particular example, the inputs at the control devices may be universal serial bus (USB) ports, or the like.

The apparatuses disclosed herein may be a device connected to the host computing device, and particularly, an expansion card, a dongle, or the like, that may be inserted into or connected to the host computing device. The apparatuses may include a hub through which the peripheral devices may be connected to a first conferencing application running on the host computing device. In some examples, the hub may include a plurality of input/output (I/O) connections, which may be connected to data buses, data sources, peripheral devices, and/or the like, in the host computing device. By way of example, a first I/O connection may connect to a peripheral device of a video conferencing system, a second I/O connection may connect to a first conferencing application, and a third I/O connection may connect to a second conferencing application via a video conferencing controller connected to the third I/O connection. A control unit may reconfigure the hub to change a connection of the peripheral device from the first conferencing application to the second conferencing application. The control unit may reconfigure the hub based on a location of a computing device having the second conferencing application at the video conferencing controller.

Through implementation of the features of the present disclosure, an infrastructure of a video conferencing meeting room, such as various types of peripheral devices, which in some instances may be permanently installed to a host computing device, may be made accessible to guest computing devices without disconnecting the peripheral devices from the host computing device. Thus, for instance, participants on guest computing devices, who may be using different conferencing applications than the host computing device, may be allowed to utilize peripheral devices installed in the video conferencing meeting room.

Figure 1A:
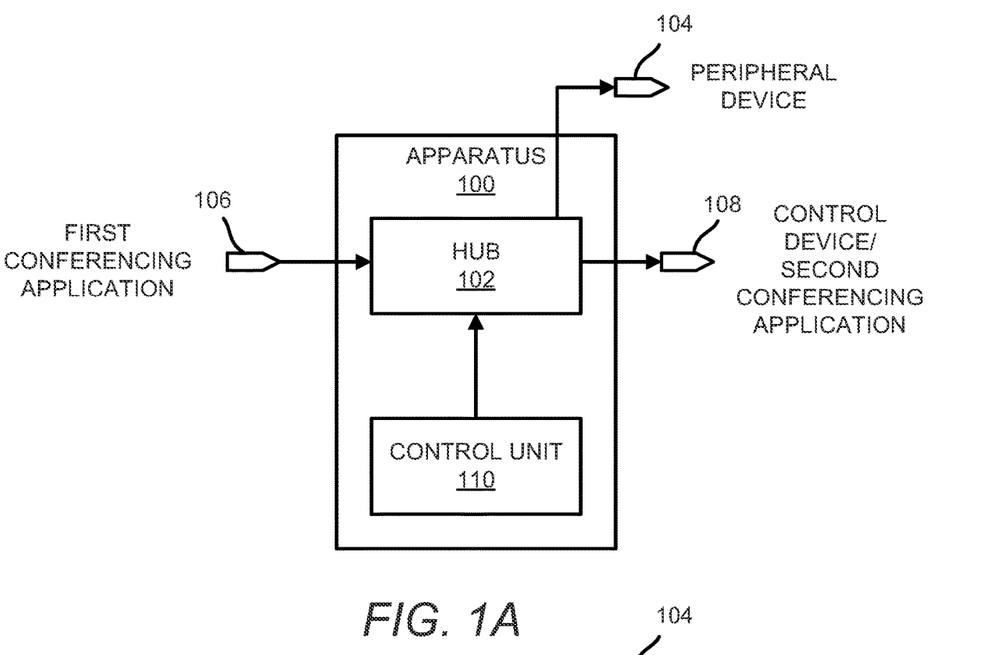
FIGS. 1A and 1B, respectively, depict block diagrams of an example apparatus that may reconfigure a hub to change a connection of a peripheral device from a first conferencing application to a second conferencing application.
Figure 1B:
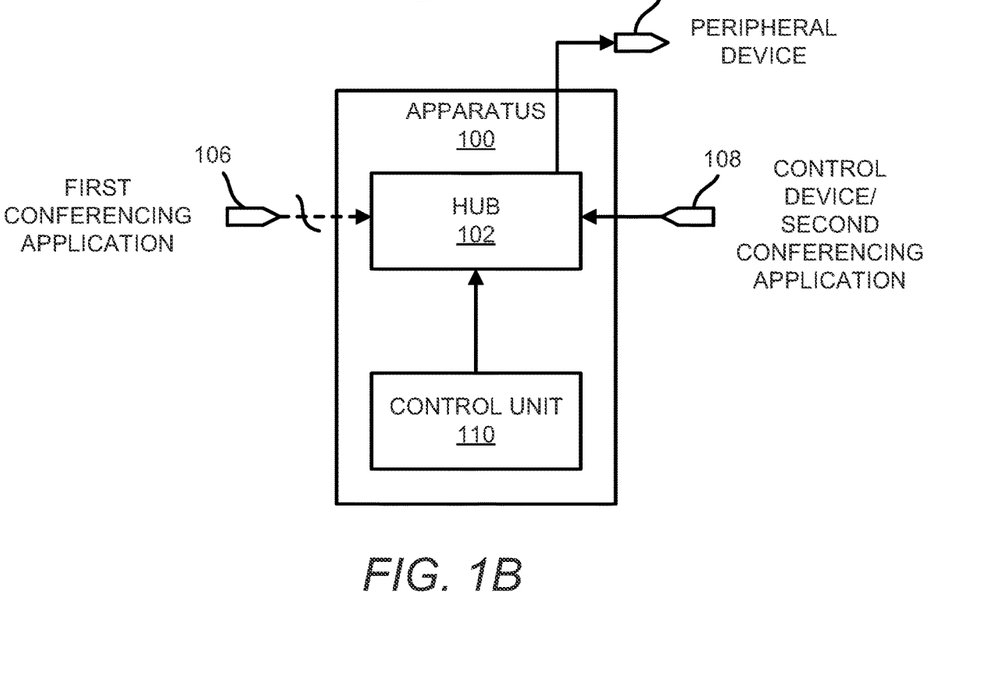
Figure 2:
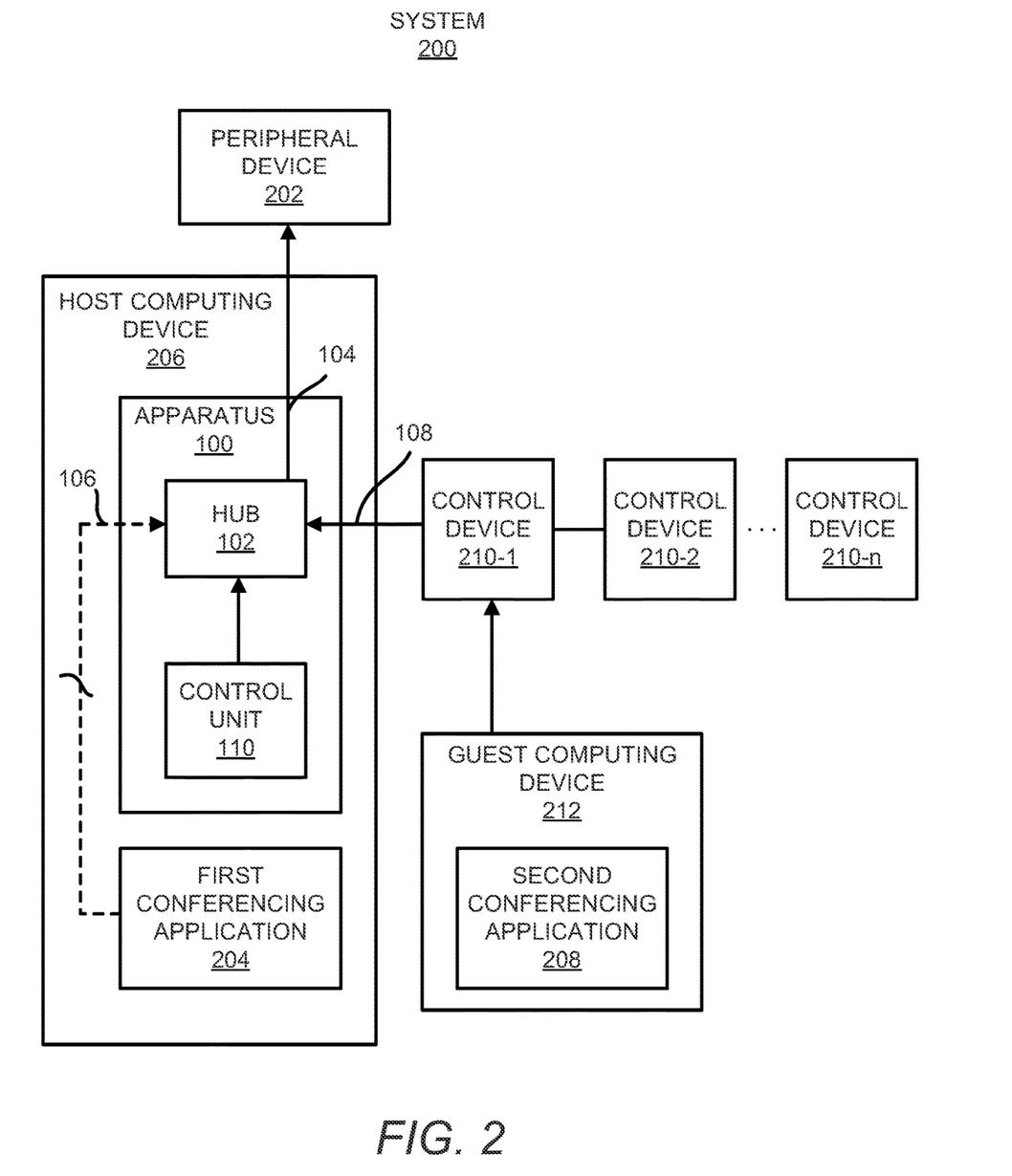
FIG. 2 shows a block diagram of an example system that may include the example apparatus depicted in FIG. 1.

Reference is made to FIGS. 1A, 1B, 2, and 3A to 3D. FIGS. 1A and 1B, respectively depict block diagrams of an example apparatus 100 that may reconfigure a hub 102 to change a connection of a peripheral device from a first conferencing application to a second conferencing application. FIG. 2 depicts a block diagram of an example system 200 that may include the example apparatus 100 depicted in FIGS. 1A and 1B. FIGS. 3A to 3D, respectively, show diagrams of an example control device 210-1 in which an input/output (I/O) connection may be reconfigured, as a downstream facing port (DFP) or an upstream facing port (UFP), based on a location of a guest computing device connected to the control devices. It should be understood that the example apparatus 100, the system 200, and the control device 210-1 may include additional features and that some of the features described herein may be removed and/or modified without departing from the scope of the apparatus 100, the system 200, and the control device 210-1.

The apparatus 100 may include a hub 102, which may be employed to connect different components of a video conferencing system 200. The hub 102 may include a first I/O connection 104, which may connect to a peripheral device 202 of the video conferencing system. The hub 102 may include a second I/O connection 106, which may connect to a first conferencing application 204 running on a host computing device 206. The hub 102 may also include a third I/O connection 108, which may connect to a second conferencing application 208 via a control device 210-1 connected to the third I/O connection 108. The hub 102 may be a device to enable connection of devices to a host system, such as the peripheral device 202 to the host computing device 206. By way of particular example and for purposes of illustration, the hub 102 may be a USB hub, which may allow connection of multiple peripheral devices to the host computing device 206 based on the USB protocol. In this regard, the I/O connections 104, 106, and 108 included in the hub 102 may be USB connections, such as USB ports. It should be understood that the I/O connections 104, 106, and 108 may be implemented over protocols other than USB, and may be implemented over different types of transport protocols, for instance, LAN, Wi-Fi, or another protocol that may support bidirectional and/or full duplex communication, and/or the like, without departing from a scope of the present disclosure.

The apparatus 100 may include a control unit 110 to control the connections in the hub 102. The control unit 110 may be an integrated circuit, a microprocessor, semiconductor-based microprocessor, a central processing unit (CPU), an application specific integrated circuit (ASIC), a field-programmable gate array (FPGA), a microcontroller unit (MCU), and/or other hardware device.

The apparatus 100 may be a card that may be added onto a computing device, such as a personal computer, a mini desktop tower computer, a laptop computer, a tablet computer, and/or the like. For instance, the apparatus 100 may be an expansion card, an interface card, and/or the like. In these examples, the apparatus 100 may be inserted into an expansion slot in the host computing device 206 or otherwise connected to the host computing device 206. In other examples, the apparatus 100 may be a dongle that may be inserted into the host computing device 206 such as, for instance, into a USB port of the host computing device 206. Suitable types of USB ports may be USB-A, USB-B, USB-C, and/or the like.

In some examples, the control unit 110 may control connections through the hub 102 in coordination with other connections through other connected hubs in the conferencing system 200, such as the hub 302 in the control device 210-1 as depicted in FIGS. 3A-3D. For instance, the control unit 110 may be connected to other control units disposed in other devices in the video conferencing system 200, such as the control device 210-1.

According to examples, the control unit 110 may reconfigure the hub 102 to change a connection of the peripheral device 202 from the first conferencing application 204 to the second conferencing application 208. The control unit 110 may detect a connection of the guest computing device 212. The control unit 110 may receive information on the location of the guest computing device 212. For instance, based on a determination that the guest computing device 212 is connected to a particular I/O connection at the control device 210-1 among the connected control devices 210-1 to 210-n, the control unit 110 may receive information regarding the guest computing device 212 from a control unit (not shown) in the guest computing device 212. As such, the control unit 110 may control the hub 102 as well as hubs in the control devices 210-1 to 210-n, in coordination with control units (not shown) in those devices, to connect the peripheral device 202 to the guest computing device 212.

In some examples, based on a first input to switch a mode of the video conferencing system 200 to a guest mode, the control unit 110 may reconfigure the hub 102 to switch control of the peripheral device 202 from the first conferencing application 204 to the second conferencing application 208. The control unit 110 may also, based on a second input to switch the mode of the video conferencing system 200 to a host mode, reconfigure the hub 102 to switch control of the peripheral device 202 from the second conferencing application 208 back to the first conferencing application 204.

The control unit 110 may reconfigure connections through the control devices 210-1 to 210-n based on the location of the guest computing device 212. In some examples, the control device 210-1 may also include a display device, such as a liquid crystal display, light emitting diode display, or the like, through which users may control various components within a conference room. The various components may include, for instance, lighting, speakers, display devices, projectors, environmental controls, webcams, and/or the like.

Figure 3A:
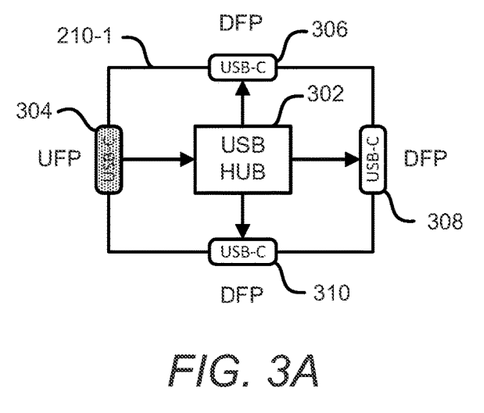
FIGS. 3A to 3D, respectively, show diagrams of an example control device in which an input/output connection may be reconfigured, as a downstream facing port (DFP) or an upstream facing port (UFP), based on a location of a guest computing device connected to the control devices.

As depicted in FIGS. 3A-3D, the control device 210-1 may include I/O connections 304, 306, 308, and 310. By way of particular example and for purposes of illustration, the I/O connections 304 to 310 may be USB ports, and the hub 302 may be a USB hub. In this example, the hub 302 is normally connected to the conferencing host via the I/O connection 304 and set as a UFP, as depicted in FIG. 3A. In these instances, the guest computing device 212 may connect via connections 306, 308, or 310. By way of particular example, when the guest computing device 212 is connected to the I/O connection 306 on the control device 210-1, the device tree may be updated to reconfigure the I/O connection 306 on the control device 210-1 correlated to the location of the guest computing device 212.

Figure 3B:
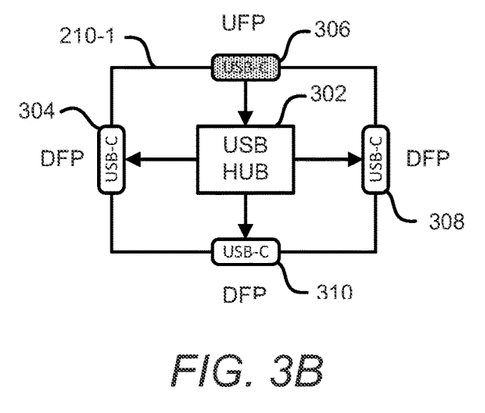
Figure 3C:
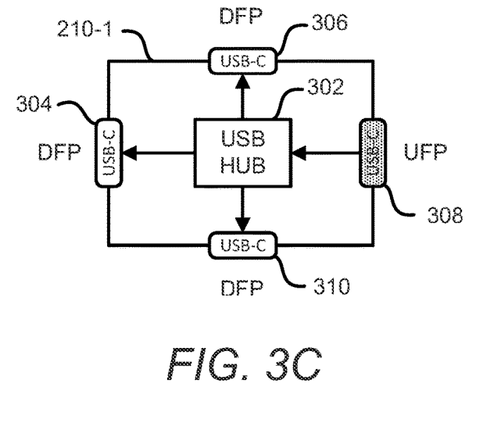
Figure 3D:
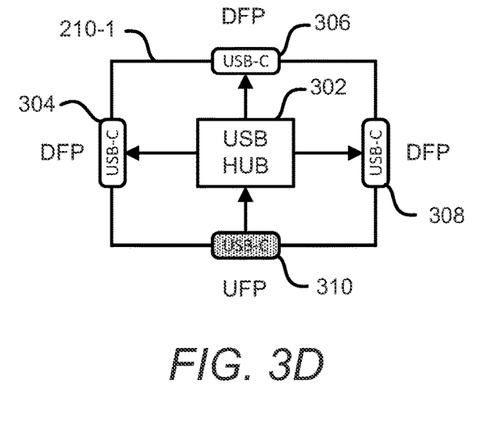

In some examples, the control device 210-1 may be one among a plurality of control devices 210-1 to 210-n that may be serially connected to each other, in a daisy-chain connection. As used herein, the term daisy-chained means to a connect a plurality of devices together in a linear series. Each of the plurality of control devices 210-1 to 210-n may include a USB hub and a plurality of I/O connections such as, for instance, USB-C ports. The control unit 110 may reconfigure the hub 102, and the USB hubs 302, to reconnect the peripheral device 202 based on an updated USB device tree, which may be based on the location of the guest computing device 212. The location of the guest computing device 212 may be correlated to an I/O connection among the plurality of I/O connections on one of the plurality of control devices 210-1 to 210-n that may be connected to the guest computing device 212. By way of example, as shown in FIG. 3A, the USB port 304 may be connected to the host and may be set to be UFP during normal operation. In these instances, when the guest computing device 212 is connected to the USB port 306, the control unit 110 may change the UPF port from the USB port 304 to the USB port 306, and set the remaining USB ports 304, 308, and 310 as a DFP, as depicted in FIG. 3B. Likewise, when the guest computing device 212 is connected to USB port 310, USB port 310 may be set to be a UFP, while the other USB ports 304, 306, and 308 may be set to be a DFP, as depicted in FIG. 3D. FIG. 3C depicts an instance in which the guest computing device 212 is connected to USB port 308. In some examples, the guest computing device 212 may be connected to a port on another control device, for instance, the control device 210-2, which may be adjacent to the control device 210-1. In these instances, the USB port 308 may be set to be UFP since the guest computing device 212 on the control device 210-2 may be connected via the USB port 308.

As shown in FIGS. 1B and 2, the control unit 110 may disconnect a USB bus, as depicted by the dotted lines in FIG. 1B and FIG. 2, to the first conferencing application 204 at the second I/O connection 106. The control unit 110 may change the third I/O connection 108 from a DFP that sends data to the control device 210-1, as shown in FIG. 1A, to a UFP to receive data from the second conferencing application 208 through the control device 210-1, as shown in FIG. 1B and FIG. 2.

In some examples, based on an input to switch a mode of the video conferencing system 200 to a guest mode, the control unit 110 may reconfigure the hub 102 based on the updated USB device tree. In this regard, the control unit 110 may disconnect USB buses connected to the plurality of I/O connections, for instance the USB ports 304 to 310 on the plurality of control devices 210-1 to 210-n, switch an I/O connection among the plurality of I/O connections connected to the guest computing device 212, for instance the USB port 310 on control device 210-1, from a DFP to a UFP, and reconnect the plurality of I/O connections 304 to 310 on the plurality of control devices 210-1 to 210-n based on the switched I/O connection and the first conferencing application 204 at the second I/O connection 106 being disconnected from the hub 102.

Figure 4:
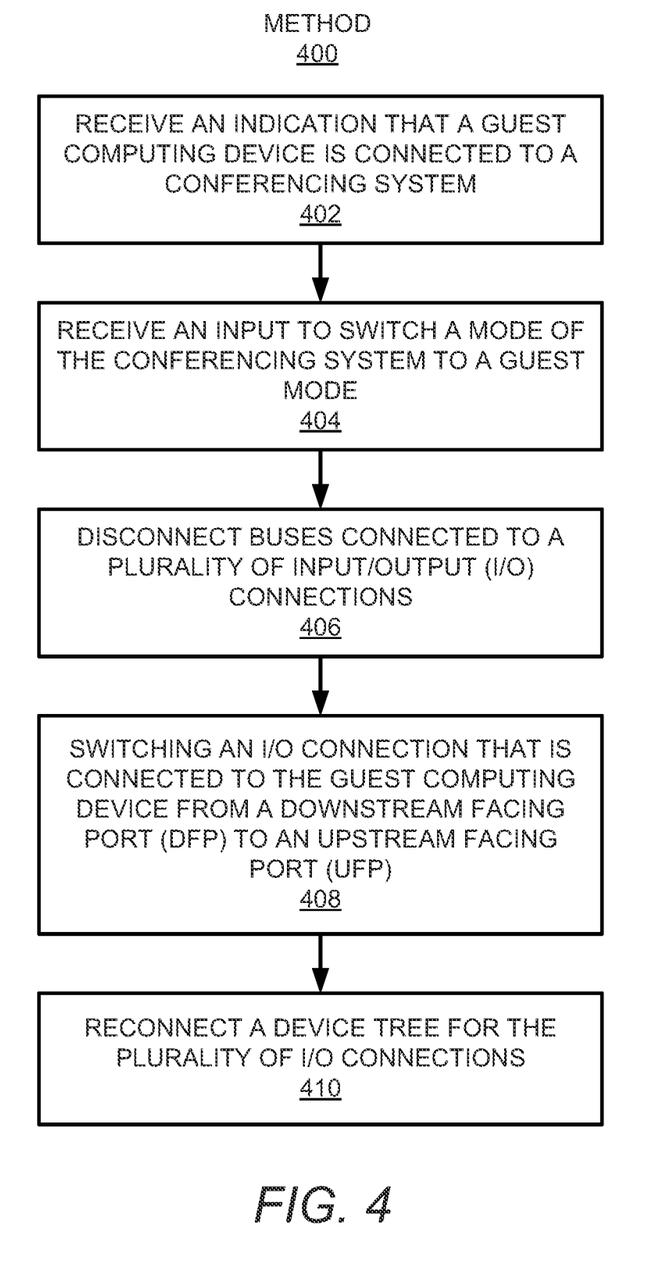
FIG. 4 shows a flow diagram of an example method for switching a mode of a conferencing system to a guest mode to reconnect a peripheral device from a host computing device to a guest computing device.

Various manners in which the apparatus 100 may operate are discussed in greater detail with respect to the method 400 depicted in FIG. 4. Particularly. FIG. 4 depicts a flow diagram of an example method 400 for switching a mode of a conferencing system 200 to a guest mode to connect a peripheral device 202 from a host computing device 206 to a guest computing device 212. It should be understood that the method 400 may include additional operations and that some of the operations described therein may be removed and/or modified without departing from the scope of the method 400. The description of the method 400 is made with reference to the features depicted in FIGS. 1A to 3D for purposes of illustration. In addition, the use of the terms "first" and "second" throughout the present disclosure should not be construed as denoting order, but instead, these terms are used herein to distinguish certain features from each other.

At block 402, a control unit 110 may receive an indication that a guest computing device 212 is connected to the conferencing system 200. The conferencing system 200 may include a host computing device 206 having a peripheral device 202 and a plurality of control devices 210-1 to 210-n, which may be connected to the host computing device 206 to connect to the guest computing device 212.

At block 404, a control unit 110 may receive an input to switch a mode of the conferencing system 200 to a guest mode. The guest mode may allow reconnection of the peripheral device 202 from the host computing device 206 to the guest computing device 212.

At block 406, based on the received input to switch to the guest mode, the control unit 110 may disconnect buses connected to the I/O connections 104, 106, and 108 in the host computing device 206 and the I/O connections, such as USB ports 304, 306, 308, and 310, in the plurality of control devices 210-1 to 210-n.

At block 408, the control unit 110 may switch an I/O connection, such as the USB port 310 in control device 210-1, that may be connected to the guest computing device 212 from a DFP to a UFP to receive data from the guest computing device 212.

At block 410, the control unit 110 may reconnect a device tree for the plurality of I/O connections, such as I/O connections 104, 106, and 108 and USB ports 304, 306, 308, and 310, based on the switched I/O connection, for instance the USB port 310, while host computing device 206 is disconnected from the peripheral device 202.

In some examples, the control unit 110 may reconnect the peripheral device 202 based on the device tree to receive data from the guest computing device 212. In this regard, the device tree may be an updated device tree based on a location of the I/O connection, for instance USB port 310, that may be connected to the guest computing device 212 among the plurality of I/O connections 304 to 310 in the plurality of control devices 210-1 to 210-n.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
    a hub including:
        a first input/output (I/O) connection to connect to a peripheral device of a video conferencing system;
        a second I/O connection to connect to a first conferencing application;
        a third I/O connection to connect to a second conferencing application via one of a plurality of control devices connected to the third I/O connection; and a control unit to reconfigure the hub to change a connection of the peripheral device from the first conferencing application to the second conferencing application, the control unit to reconfigure the hub based on a location of a computing device, wherein the second conferencing application is executed on the computing device,
wherein the location of the computing device is correlated to at least one of:
an identity of one of the plurality of control devices that is connected to the computing device; or
an identity of an I/O connection among a plurality of I/O connections on the one of the plurality of control devices that is connected to the computing device.

2. The apparatus of claim 1, wherein
based on a first input to switch a mode of the video conferencing system to a guest mode, the control unit reconfigures the hub to switch control of the peripheral device from the first conferencing application to the second conferencing application; and
based on a second input to switch the mode of the video conferencing system to a host mode, the control unit reconfigures the hub to switch control of the peripheral device from the second conferencing application to the first conferencing application.

3. The apparatus of claim 1, wherein the location of the computing device is stored in a device tree, and
when the computing device is connected to the I/O connection on the one of the plurality of control devices, the device tree is updated to reconfigure the I/O connection on the one of the plurality of control devices correlated to the location of the computing device.

4. The apparatus of claim 3, wherein the hub is a universal serial bus (USB) hub, and the control unit reconfigures the USB hub based on the device tree to:
disconnect a USB bus to the first conferencing application at the second I/O connection; and
change the third I/O connection from a downstream facing port (DFP) that sends data to the control device to an upstream facing port (UFP) to receive data from the second conferencing application through the one of the plurality of control devices.

5. The apparatus of claim 1, wherein each of the plurality of control devices comprises a universal serial bus (USB) hub and the plurality of I/O connections.

6. The apparatus of claim 5, wherein the control unit reconfigures the hub to reconnect the peripheral device based on an updated USB device tree, the updated USB device tree being based on the location of the computing device, the location of the computing device being correlated to the I/O connection among the plurality of I/O connections on the one of the plurality of control devices that is connected to the computing device.

7. The apparatus of claim 5, wherein
based on an input to switch a mode of the video conferencing system to a guest mode, the control unit reconfigures the hub based on an updated USB device tree, by:
disconnecting USB buses connected to the plurality of I/O connections on the plurality of control devices;
switching the I/O connection among the plurality of I/O connections connected to the computing device from a downstream facing port (DFP) to an upstream facing port (UFP); and
reconnecting the plurality of I/O connections on the plurality of control devices based on the switched I/O connection and the first conferencing application at the second I/O connection being disconnected from the hub.

8. A system comprising:
a plurality of control devices to connect to a guest computing device; and
an apparatus connected to the control device, the apparatus comprising:
a hub including:
a first input/output (I/O) connection connected to a peripheral device;
a second I/O connection connected to a first conferencing application in a host computing device;
a third I/O connection connected to the plurality of control devices to connect the peripheral device to a second conferencing application stored on the guest computing device via one of the plurality of control devices; and
a control unit to reconfigure the hub to change a connection of the peripheral device from the first conferencing application to the second conferencing application, the control unit to reconfigure the hub based on a location of the guest computing device,
wherein the location of the guest computing device is correlated to at least one of:
an identity of one of the plurality of control devices that is connected to the guest computing device; or
an identity of an I/O connection among a plurality of I/O connections on the one of the plurality of control devices that is connected to the guest computing device.

9. The system of claim 8, wherein the control unit reconfigures the hub based on an input to switch to a guest mode, the guest mode to switch control of the peripheral device from the first conferencing application to the second conferencing application.

10. The system of claim 8, wherein the location of the guest computing device is stored in a device tree, and
when the guest computing device is connected to an I/O connection on the one of the plurality of control devices, the device tree is updated to reconfigure the I/O connection on the one of the plurality of control devices correlated to the location of the guest computing device.

11. The system of claim 10, wherein the hub is a universal serial bus (USB) hub, and the control unit reconfigures the USB hub based on the device tree to:
disconnect a USB bus to the first conferencing application at the second I/O connection; and
change the third I/O connection from a downstream facing port (DFP) that sends data to the one of the plurality of control devices to an upstream facing port (UFP) to receive data from the second conferencing application through the one of the plurality of control devices.

12. The system of claim 8, wherein each of the plurality of control devices comprises a second hub and the plurality of I/O connections, and wherein the control unit reconfigures the hub to reconnect the peripheral device based on an updated device tree, the updated device tree being based on the location of the guest computing device, the location of the guest computing device being correlated to the I/O connection among the plurality of I/O connections on the one of the plurality of control devices that is connected to the guest computing device.

13. The system of claim 12, wherein, based on an input to switch a mode to a guest mode, the control unit is to update a USB device tree to reconfigure the hub by:
- disconnecting buses connected to the plurality of I/O connections on the plurality of control devices,
- switching the I/O connection connected to the guest computing device from a downstream facing port (DFP) to an upstream facing port (UFP), and
- reconnecting the plurality of I/O connections on the plurality of control devices based on the switched I/O connection and the second conferencing application at the second I/O connection being disconnected from the hub.

14. A method comprising:
- receiving, by a control unit, an indication that a guest computing device is connected to a conferencing system, the conferencing system comprising a host computing device having a peripheral device and a plurality of control devices connected to the host computing device to connect to the guest computing device;
- receiving, by the control unit, an input to switch a mode of the conferencing system to a guest mode, the guest mode to reconnect the peripheral device from the host computing device to the guest computing device;
- based on the received input to switch to the guest mode, disconnecting, by the control unit, buses connected to a plurality of input/output (I/O) connections in the host computing device and the plurality of control devices;
- switching, by the control unit, an I/O connection that is connected to the guest computing device from a downstream facing port (DFP) to an upstream facing port (UFP) to receive data from the guest computing device based on a location of the guest computing device; and
- reconnecting, by the control unit, a device tree for the plurality of I/O connections based on the switched I/O connection while host computing device is disconnected from the peripheral device,
- wherein the location of the guest computing device is correlated to at least one of:
  - an identity of one of the plurality of control devices that is connected to the guest computing device; or
  - an identity of an I/O connection among the plurality of I/O connections on the one of the plurality of control devices that is connected to the guest computing device.

15. The method of claim 14, further comprising:
- reconnecting, by the control unit, the peripheral device based on the device tree to receive data from the guest computing device, the device tree being an updated device tree based on the location of the I/O connection that is connected to the guest computing device among the plurality of I/O connections in the plurality of control devices.

16. The apparatus of claim 1, wherein the plurality of control devices are serially connected to each other in a daisy-chain connection.

17. The apparatus of claim 1, wherein the apparatus is a part of a host computing device that includes the first conferencing application.

18. The apparatus of claim 17, wherein the peripheral device of the video conferencing system is permanently installed to the host computing device.

19. The apparatus of claim 1, wherein at least one of the first I/O connection, the second I/O connection, or the third I/O connection is a wireless connection.

20. The system of claim 8, wherein the peripheral device is hardwired to the host computing device.

* * * * *